US012715209B2

(12) United States Patent
Arakawa

(10) Patent No.: US 12,715,209 B2
(45) Date of Patent: Aug. 25, 2026

(54) LIQUID EJECTING DEVICE INCLUDING HEAD UNIT, AND MOUNTING UNIT HAVING POSITIONING PART FOR POSITIONING HEAD UNIT RELATIVE TO MOUNTING UNIT

(71) Applicant: BROTHER KOGYO KABUSHIKI KAISHA, Nagoya (JP)

(72) Inventor: Yuta Arakawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 221 days.

(21) Appl. No.: 18/589,999

(22) Filed: Feb. 28, 2024

(65) Prior Publication Data

US 2024/0308205 A1 Sep. 19, 2024

(30) Foreign Application Priority Data

Mar. 13, 2023 (JP) ................................ 2023-038496

(51) Int. Cl.
*B41J 2/045* (2006.01)
*B41J 2/14* (2006.01)

(52) U.S. Cl.
CPC ........ *B41J 2/04526* (2013.01); *B41J 2/14201* (2013.01); *B41J 2002/14467* (2013.01); *B41J 2202/14* (2013.01)

(58) Field of Classification Search
CPC ................ B41J 2/04526; B41J 2/14201; B41J 2/14233; B41J 2/1752; B41J 2002/14467; B41J 2202/14; B41J 2202/19; B41J 2/01; B41J 2/02; B41J 2/135; B41J 2/14; B41J 2/14008; B41J 2/14016; B41J 2/14314
See application file for complete search history.

(56) References Cited

U.S. PATENT DOCUMENTS 6,554,411 B1 * 4/2003 Hatasa ................ B41J 2/17503 347/86
2021/0213736 A1 7/2021 Takahashi et al.

FOREIGN PATENT DOCUMENTS

JP 2021-109377 A 8/2021

* cited by examiner

*Primary Examiner* — Kristal Feggins
(74) *Attorney, Agent, or Firm* — Merchant & Gould P.C.

(57) ABSTRACT

A liquid ejecting device includes: a head unit including a first channel member formed with a first channel having a first communication port; and a mounting unit including a positioning part and a second channel member formed with a second channel having a second communication port. The liquid ejecting device is switchable between: a first state in which the head unit is not positioned relative to the mounting unit, and the first communication port and the second communication port are not in communication with each other; and a second state in which the head unit is positioned relative to the mounting unit, and the first communication port and the second communication port are in communication with each other. The liquid ejecting device is shifted from the first state to the second state as the second channel member and the positioning part are moved relative to the head unit.

16 Claims, 6 Drawing Sheets

LIQUID EJECTING DEVICE INCLUDING HEAD UNIT, AND MOUNTING UNIT HAVING POSITIONING PART FOR POSITIONING HEAD UNIT RELATIVE TO MOUNTING UNIT

REFERENCE TO RELATED APPLICATIONS

This application claims priority from Japanese Patent Application No. 2023-038496 filed on Mar. 13, 2023. The entire content of the priority application is incorporated herein by reference.

BACKGROUND ART

A prior art describes a printing apparatus including a head unit, and a carriage on which the head unit is mountable. When the head unit is mounted on the carriage, in one step, the head unit is positioned relative to the carriage, and in a subsequent step, channels in the head unit are placed in communication with channels in a liquid supply unit of the carriage.

SUMMARY

However, the operation for mounting the head unit in the carriage according to the above printing apparatus is complicated, since the operation involves multiple steps.

In view of the foregoing, it is an object of the present disclosure to provide a liquid ejecting device in which the operation for mounting a head unit is simplified.

In order to attain the above and other object, the present disclosure provides a liquid ejecting device including: a head unit; and a mounting unit which the head unit is mountable on and removable from. The head unit includes a first channel member formed with a first channel having: an ejection hole; and a first communication port in communication with the ejection hole. The mounting unit supports the head unit in a state where the head unit is mounted on the mounting unit. The mounting unit includes: a second channel member; and a positioning part. The second channel member is formed with a second channel having a second communication port. The liquid ejecting device is switchable between: a first state in which the head unit is not positioned relative to the mounting unit, and the first communication port and the second communication port are not in communication with each other; and a second state in which the head unit is positioned relative to the mounting unit with the positioning part, and the first communication port and the second communication port are in communication with each other. The liquid ejecting device is shifted from the first state to the second state as the second channel member and the positioning part are moved relative to the head unit.

In the above structure, the liquid ejecting device is switched from the first state to the second state due to relative movement of both the second channel member and the positioning part to the head unit. Through this action, the process of connecting the first channel and the second channel to each other and the process of positioning the head unit can be achieved with a single step, thereby simplifying the operation for mounting the head unit on the mounting unit.

DESCRIPTION

Figure 1:
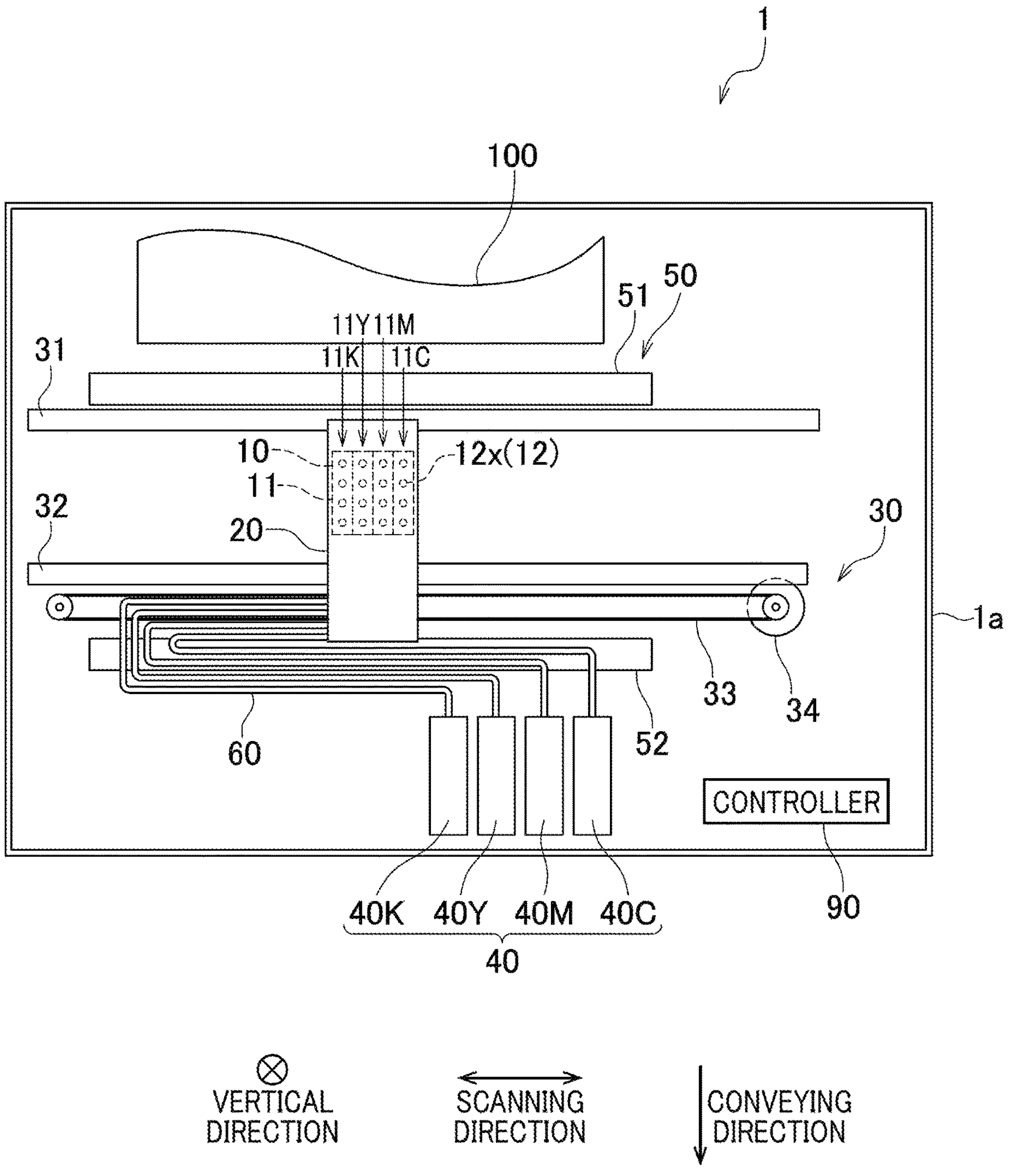
FIG. 1 is a conceptual plan view illustrating an internal structure of a printer 1.

FIG. 1 shows a printer 1 according to one embodiment of the present disclosure. The printer 1 includes a housing 1*a*, a head unit 10, a mounting unit 20, a scanning mechanism 30, a tank unit 40, a conveying mechanism 50, and a controller 90. The head unit 10, the mounting unit 20, the scanning mechanism 30, the tank unit 40, the conveying mechanism 50, and the controller 90 are disposed inside the housing 1*a*. The printer 1 is an example of the "liquid ejecting device" of the present disclosure.

The head unit 10 includes a channel member 11. The channel member 11 is formed with four channels 12 corresponding to ink in the respective colors cyan, magenta, yellow, and black. Each channel 12 has a plurality of ejection holes 12*x*; a plurality of individual channels 12*b* corresponding one-on-one with the plurality of ejection holes 12*x*; a common channel 12*a* in communication with the plurality of individual channels 12*b*; and a communication ports 12*y* in communication with the common channel 12*a*. The channel member 11 is an example of the "first channel member" of the present disclosure. The channel 12 is an example of the "first channel" of the present disclosure.

The ejection holes 12*x* of the channels 12 constitute four columns 11C, 11M, 11Y, and 11K. The columns 11C, 11M, 11Y, and 11K are juxtaposed in a scanning direction. Each of the columns 11C, 11M, 11Y, and 11K is configured of the ejection holes 12*x* aligned in a conveying direction. The ejection holes 12*x* constituting the column 11C are holes for ejecting cyan ink; the ejection holes 12*x* constituting the column 11M are holes for ejecting magenta ink; the ejection holes 12*x* constituting the column 11Y are holes for ejecting yellow ink; and the ejection holes 12*x* constituting the column 11K are holes for ejecting black ink.

Figure 2:
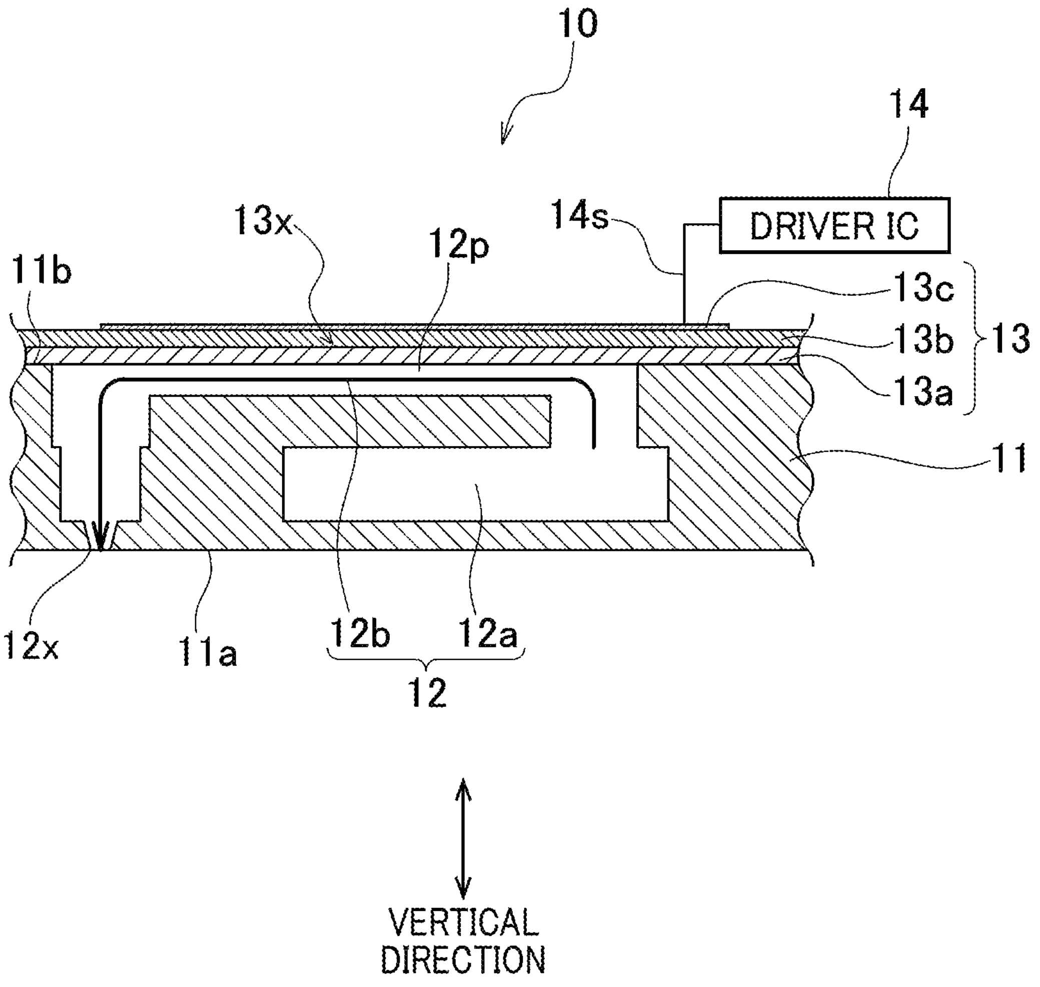
FIG. 2 is a cross-sectional view of a head unit 10 included in the printer 1.

As shown in FIG. 2, the four common channels 12*a* (i.e., the four channels 12) corresponds to the respective columns 11C, 11M, 11Y, and 11K (see FIG. 1). As described above, the plurality of individual channels 12*b* of each channel 12 is in communication with the common channel 12*a* of the channel 12. Each individual channel 12*b* includes a pressure chamber 12*p* and extends from an outlet of the corresponding common channel 12*a* to the corresponding ejection hole 12*x* via the pressure chamber 12*p*.

Figure 3:
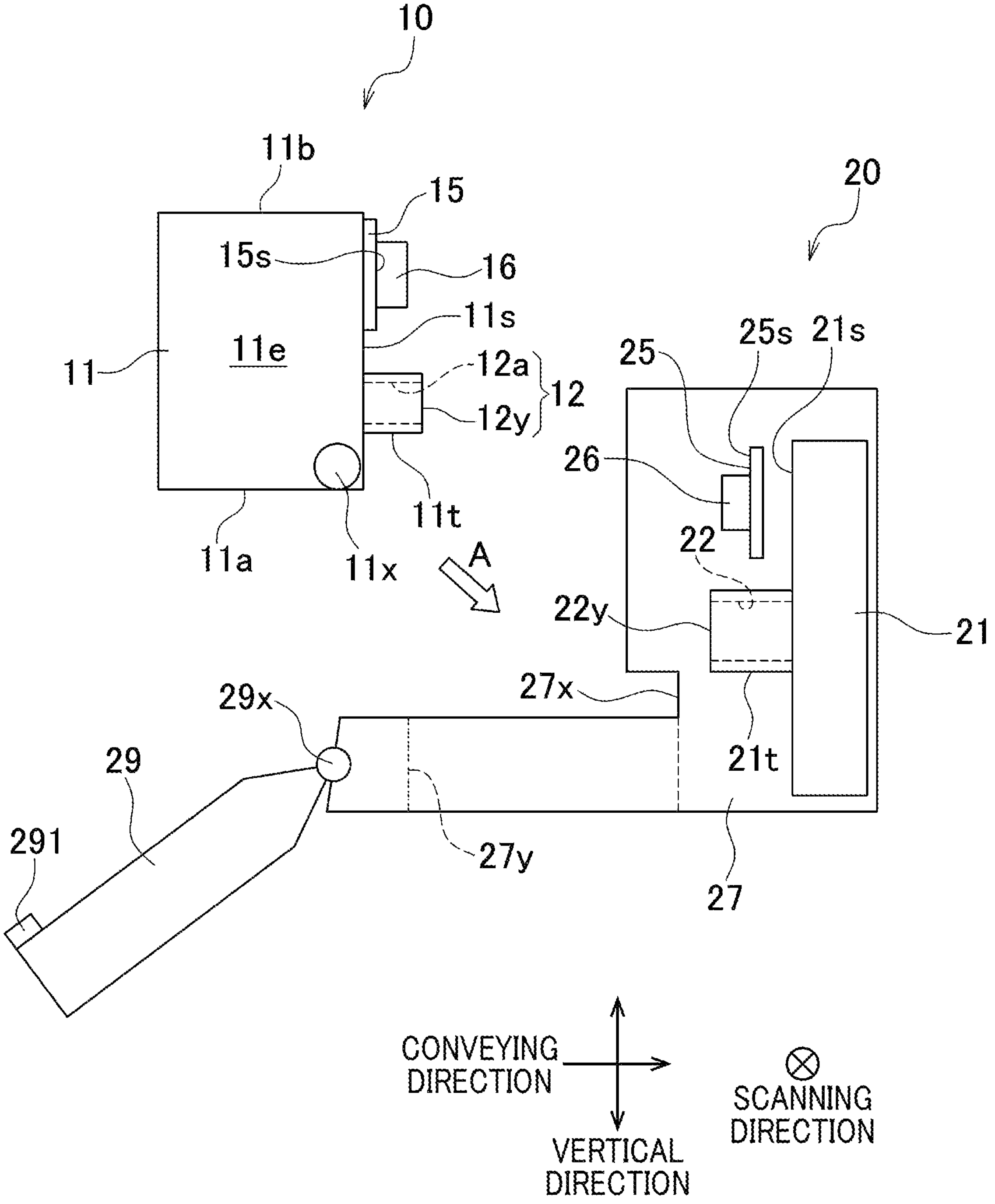
FIG. 3 is a side view illustrating the first process in the operation for mounting the head unit 10 on a mounting unit 20.

Each of the four common channels 12*a* has one end region that is in communication with the plurality of corresponding individual channels 12*b* belonging to the corresponding one of the columns 11C, 11M, 11Y, and 11K and another end that is in communication with the corresponding communication port 12*y* (see FIG. 3). The communication port 12*y* constitutes one end of the channel 12, and the ejection holes 12*x* constitute the other end of the channel 12. Thus, the communication port 12*y* is in communication with the corresponding ejection holes 12*x*. The communication port 12*y* is an example of the "first communication port" of the present disclosure.

The channel member 11 has a bottom surface 11*a*, and a top surface 11*b* on the side opposite the bottom surface 11*a*. The ejection holes 12*x* are open in the bottom surface 11*a*, while the pressure chambers 12*p* are open in the top surface 11*b*. The bottom surface 11*a* is an example of the "ejection surface" of the present disclosure. The top surface 11*b* is an example of the "opposite surface" of the present disclosure.

As shown in FIG. 2, the head unit 10 also includes an actuator member 13, and a driver IC 14.

The actuator member 13 includes a metal diaphragm 13*a*; a piezoelectric layer 13*b*; and a plurality of individual electrodes 13*c* corresponding one-on-one with the plurality of pressure chambers 12*p*. The diaphragm 13*a* is arranged on the top surface 11*b* of the channel member 11 so as to cover the plurality of pressure chambers 12*p*. The piezoelectric layer 13*b* is arranged over the top surface of the diaphragm 13*a*. Each individual electrode 13*c* is arranged on the top surface of the piezoelectric layer 13*b* at a position opposing the corresponding pressure chamber 12*p*.

The diaphragm 13*a* and the plurality of individual electrodes 13*c* are electrically connected to the driver IC 14 via signal lines 14*s*. Under control of the controller 90, the driver IC 14 maintains the diaphragm 13*a* at ground potential while varying the potentials of the individual electrodes 13*c*. The potential of each individual electrode 13*c* is changed between a prescribed drive potential and the ground potential.

The change in potential of each individual electrode 13*c* causes deformation in the portions of the diaphragm 13*a* and the piezoelectric layer 13*b* sandwiched between the individual electrode 13*c* and the corresponding pressure chamber 12*p*. The portions of the diaphragm 13*a* and the piezoelectric layer 13*b* sandwiched between the individual electrode 13*c* and the corresponding pressure chamber 12*p* function as an actuator 13*x*. This deformation changes the volume in the pressure chamber 12*p*, applying pressure to ink in the pressure chamber 12*p* and causing ink to be ejected from the corresponding ejection hole 12*x*. An actuator 13*x* is provided for each individual electrode 13*c* and can be independently deformed in accordance with the electric potential supplied to the corresponding individual electrode 13*c*.

Figure 4:
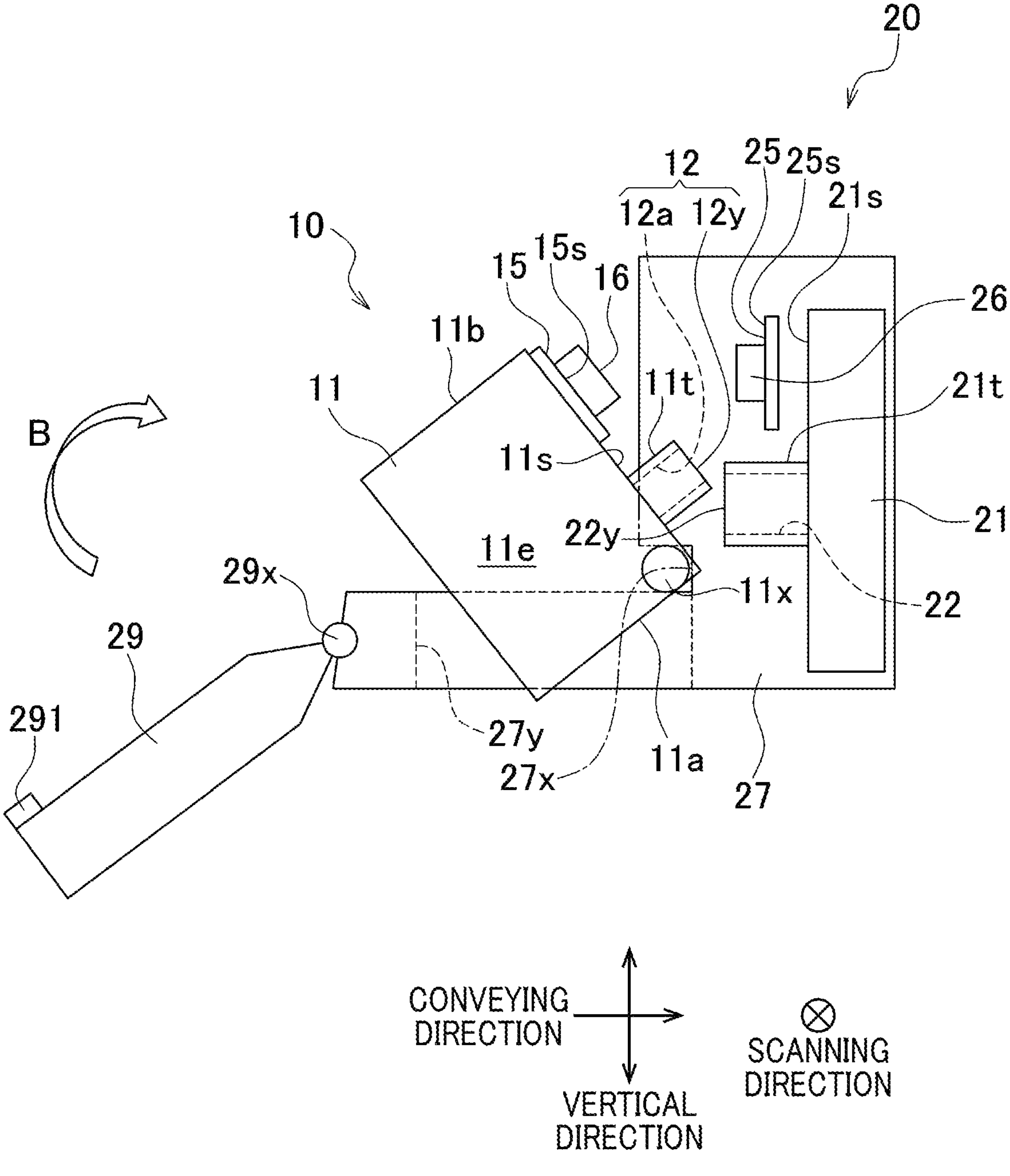
FIG. 4 is a side view illustrating the second process in the operation for mounting the head unit 10 on the mounting unit 20.
Figure 5:
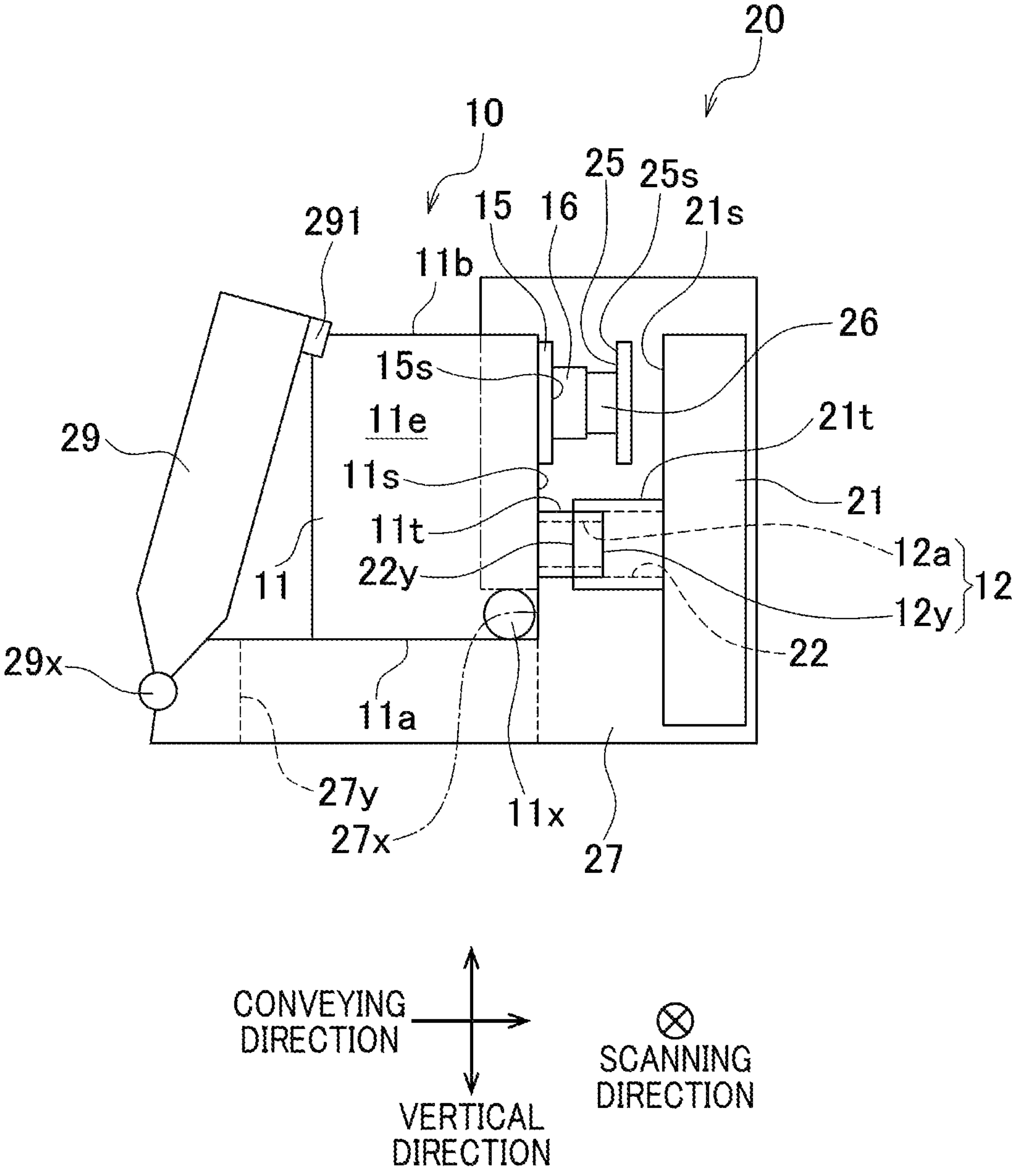
FIG. 5 is a side view illustrating a state where the operation for mounting the head unit 10 on the mounting unit 20 has been completed.

The head unit 10 also includes an electronic member 15 (see FIGS. 3 through 5). The electronic member 15 is an example of the "first electronic member" of the present disclosure. The electronic member 15 is provided on one end of a flexible printed circuit board (FPC) with the signal lines 14*s*. The driver IC 14 shown in FIG. 2 is also mounted on the FPC. The one end of the FPC is connected to the electronic member 15, and the other end of the FPC is connected to the actuator member 13.

The head unit 10 is mountable on and removable from the mounting unit 20. The mounting unit 20 supports the head unit 10 in a state where the head unit 10 is mounted on the mounting unit 20. As shown in FIGS. 3 through 5, the mounting unit 20 includes a channel member 21 configured to be connected to the channel member 11, and an electronic member 25 configured to be electrically connected to the electronic member 15. The channel member 21 is formed with four channels 22 corresponding one-on-one with four tubes 60 described later (see FIG. 1). The electronic member 25 is an example of the "second electronic member" of the present disclosure. The channel member 21 is an example of the "second channel member" of the present disclosure. The channel 22 is an example of the "second channel" of the present disclosure.

The scanning mechanism 30 includes a pair of guides 31 and 32 for supporting the mounting unit 20, a belt 33 coupled to the mounting unit 20, and a scanning motor 34, as shown in FIG. 1. The guides 31 and 32 and the belt 33 extend in the scanning direction. When the scanning motor 34 is driven under control of the controller 90, the belt 33 circulates, moving the mounting unit 20 along the guides 31 and 32 in the scanning direction.

The conveying mechanism 50 includes roller pairs 51 and 52, and a conveying motor. When the conveying motor is driven under control of the controller 90, the rollers in the roller pairs 51 and 52 rotate. When the rollers rotate while a sheet 100 of paper is nipped between the rollers of the roller pair 51 and/or between the rollers of the roller pair 52, the sheet 100 is conveyed in the conveying direction.

The tank unit 40 includes four tanks 40C, 40M, 40Y, and 40K that store ink in the respective colors cyan, magenta, yellow, and black. Each of the four tanks 40C, 40M, 40Y, and 40K is connected to the channel 12 of the corresponding color in the channel member 11 of the head unit 10 mounted on the mounting unit 20 via the corresponding tube 60 and the corresponding channel 22 of the channel member 21.

The scanning direction, the conveying direction, and the vertical direction are orthogonal to one another.

Next, the configurations of the head unit 10 and the mounting unit 20 will be described in greater detail.

As shown in FIG. 3, the channel member 11 of the head unit 10 has the bottom surface 11*a*, the top surface 11*b*, and four side surfaces connecting the bottom surface 11*a* to the top surface 11*b*. The four side surfaces include a side surface 11*s* that faces downstream in the conveying direction, two side surfaces 11*e* that are orthogonal to the scanning direction, and a side surface that faces upstream in the conveying direction (the surface on the side opposite the side surface 11*s*).

A protrusion 11*x* is provided on each of the side surfaces 11*e*. Each protrusion 11*x* is located in the corner of the corresponding side surface 11*e* that is formed by the bottom edge of the side surface 11*e* and the downstream edge in the conveying direction of the side surface 11*e*. Each protrusion 11*x* protrudes outward in the scanning direction from the corresponding side surface 11*e*.

Four tubes 11*t* are provided on the side surface 11*s* of the channel member 11. Each of the four communication ports 12*y* is open on the distal end of the corresponding one of the four tubes 11*t*. That is, each of the first communication ports 12*y* is open in the side surface 11*s*. The four tubes 11*t* (i.e., the four communication ports 12*y*) are aligned in the scanning direction. The side surface 11*s* is an example of the "first surface" of the present disclosure.

The electronic member 15 is arranged on the side surface 11*s* at a position above the tubes 11*t*. The electronic member 15 includes four terminals 16 (see FIG. 6B) provided on a surface 15*s* of the electronic member 15. The four terminals 16 are aligned in the scanning direction. The terminal 16 is an example of the "first terminal" of the present disclosure. The surface 15*s* is an example of the "fourth surface" of the present disclosure.

As shown in FIG. 3, the mounting unit 20 includes a support member 27, and a pivot member 29 attached to the support member 27 such that the pivot member 29 is pivotally movable.

The support member 27 is a member that supports the head unit 10 in a state where the head unit 10 is mounted on the mounting unit 20. The support member 27 has two recesses 27_x_, and an opening 27_y_. The protrusions 11_x_ of the channel member 11 are configured to be fitted into the respective recesses 27_x_ of the support member 27. As shown in FIG. 4, the channel member 11 can be accommodated in the opening 27_y_ when the head unit 10 is mounted on the mounting unit 20.

The pivot member 29 is attached to the upstream end of the support member 27 in the conveying direction so as to be pivotally movable about a pivot shaft 29_x_ between an open position (the position shown in FIG. 4) and a closed position (the position shown in FIG. 5). The pivot shaft 29_x_ extends in the scanning direction.

The mounting unit 20 also includes an urging member 291 provided at the distal end of the pivot member 29, which is the opposite end from the pivot shaft 29_x_. The urging member 291 is configured of a spring and a resin component to which the spring is attached. The urging member 291 is an example of the "positioning part" of the present disclosure.

The channel member 21 has a side surface 21_s_ that faces upstream in the conveying direction. Four tubes 21_t_ are provided on the side surface 21_s_. The side surface 21_s_ is an example of the "second surface" of the present disclosure. A communication port 22_y_, which constitutes the other end of the corresponding channel 22, is open on the distal end of each of the tubes 21_t_ provided on the side surface 21_s_. That is, each of the communication ports 22_y_ is open in the side surface 21_s_. The communication ports 22_y_ are configured to be in communication with corresponding communication ports 12_y_ formed in the channel member 11 (see FIG. 5). The communication port 22_y_ is an example of the "second communication port" of the present disclosure. The four tubes 21_t_ (i.e., the four communication ports 22_y_) are aligned in the scanning direction (see FIG. 6A).

The electronic member 25 is disposed upstream in the conveying direction relative to the side surface 21_s_ of the channel member 21 at a position above the tubes 21_t_. The electronic member 25 has a surface 25_s_ that faces upstream in the conveying direction. The surface 25_s_ is an example of the "third surface" of the present disclosure. The electronic member 25 includes four terminals 26 (see FIG. 6B) arranged on the surface 25_s_. The four terminals 26 are aligned in the scanning direction. The terminals 26 are slightly smaller than the terminals 16. The terminals 26 are arranged above the communication ports 22_y_. The terminal 26 is an example of the "second terminal" of the present disclosure.

Next, the operations for mounting the head unit 10 on the mounting unit 20 will be described.

First, the pivot member 29 of the mounting unit 20 is placed in the open position, as shown in FIG. 3. In this state, the head unit 10 is moved in a direction diagonally downward and downstream in the conveying direction (the direction indicated by an arrow A) while the side surface 11_s_ of the channel member 11 faces downstream in the conveying direction. Through this action, the protrusions 11_x_ are fitted in the corresponding recesses 27_x_, as shown in FIG. 4. At this time, the head unit 10 is oriented such that the side surface 11_s_ faces diagonally upward and downstream in the conveying direction and the lower portion of the channel member 11 is accommodated in the opening 27_y_.

Next, the pivot member 29 is moved from the open position shown in FIG. 4 to the closed position shown FIG. 5 by pivotally moving in the direction indicated by an arrow B. Once the pivot member 29 has been placed in the closed position, the operation for mounting the head unit 10 on the mounting unit 20 is completed.

When the pivot member 29 is moved from the open position (see FIG. 4) to the closed position (see FIG. 5), the urging member 291 contacts the head unit 10 and presses the head unit 10 downstream in the conveying direction. Accordingly, the head unit 10 is pivotally moved about the protrusions 11_x_ and is moved toward the channel member 21 and the electronic member 25. At this time, the tubes 11_t_ are inserted into the corresponding tubes 21_t_ to establish fluid communication between the communication ports 12_y_ and the corresponding communication ports 22_y_, and the terminals 16 on the electronic member 15 contact the corresponding terminals 26 on the electronic member 25. As a result, both connections between the channels 12 and 22 and connections between the terminals 16 and 26 are attained.

Figure 6A:
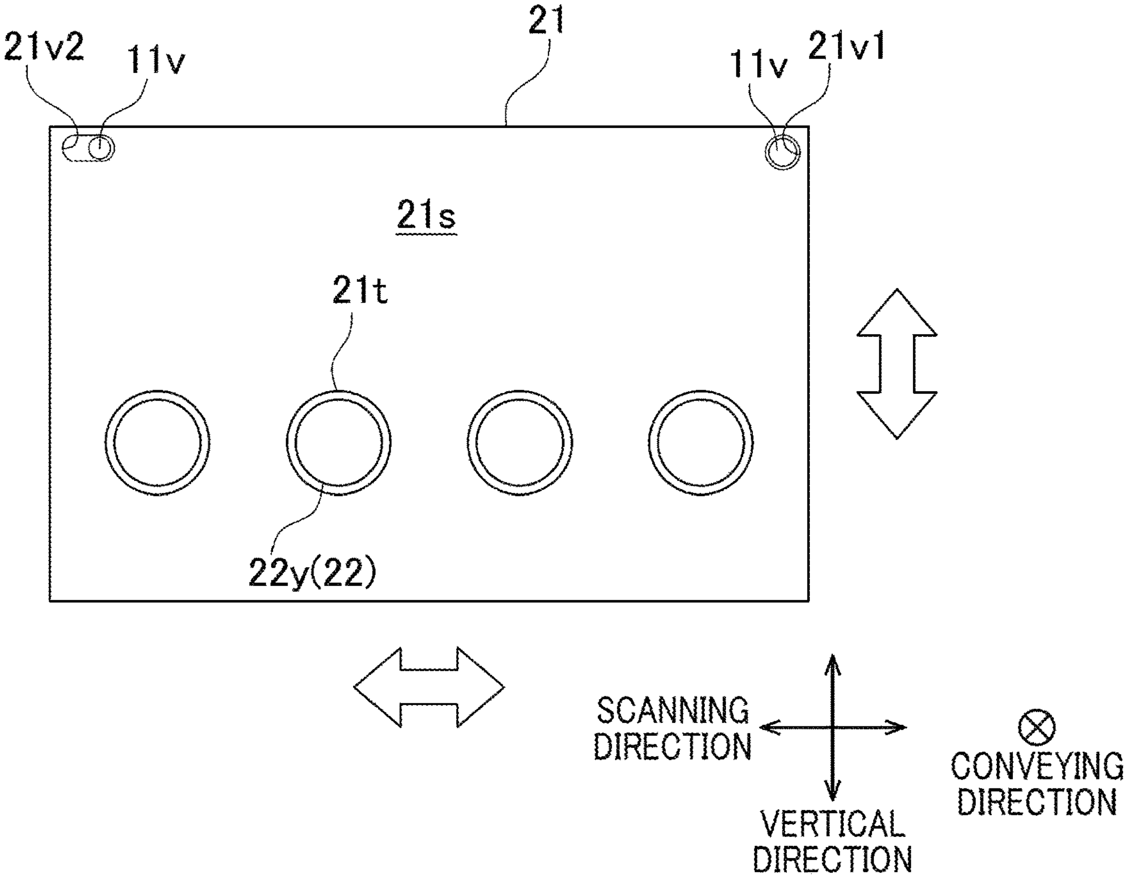
FIG. 6A is a view illustrating a side surface 21*s* of a channel member 21 of the mounting unit 20 on which communication ports 22*y* are open.

The channel member 21 is connected to the support member 27 so as to be movable in directions parallel to the side surface 21_s_, as indicated by arrows shown in FIG. 6A. The side surface 21_s_ is formed with two holes 21_v_1 and 21_v_2 at different positions from the communication ports 22_y_. The hole 21_v_1 is an example of the "hole" of the present disclosure. The hole 21_v_2 is an example of the "another hole" of the present disclosure.

The holes 21_v_1 and 21_v_2 are both formed at corners of the side surface 21_s_. The hole 21_v_1 is arranged at one end of the side surface 21_s_ in the scanning direction, while the hole 21_v_2 is arranged at the other end of the side surface 21_s_ in the scanning direction. The hole 21_v_1 is shaped in a perfect circle, while the hole 21_v_2 has an elliptical shape that is elongated in the scanning direction. The hole 21_v_2 is longer in the scanning direction than the hole 21_v_1. In other words, the length of the hole 21_v_2 in the scanning direction is greater than the length of the hole 21_v_1 in the scanning direction.

In the meantime, the channel member 11 includes two protrusions 11_v_ on the side surface 11_s_ in which the communication ports 12_y_ are formed. Each protrusion 11_v_ has a columnar shape, and is configured to be fitted into a corresponding one of the holes 21_v_1 and 21_v_2. The protrusions 11_v_ are arranged in corners of the side surface 11_s_. The protrusion 11_v_ is an example of the "protrusion" and the "another protrusion" of the present disclosure.

The side surface 11_s_ in the channel member 11 and the side surface 21_s_ in the channel member 21 are fixed in position relative to each other by fitting the protrusions 11_v_ into the corresponding holes 21_v_1 and 21_v_2.

Figure 6B:
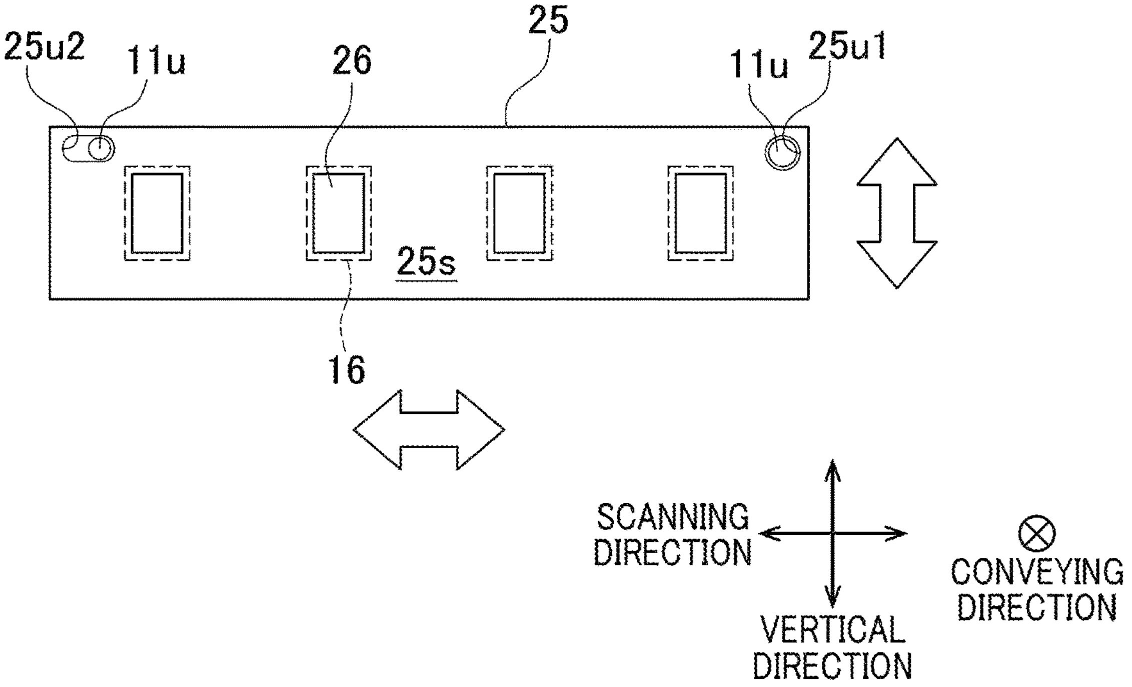
FIG. 6B is a view illustrating a surface 25*s* of an electronic member 25 of the mounting unit 20 on which terminals 26 are provided.

The electronic member 25 is connected to the support member 27 so as to be movable in directions parallel to the surface 25_s_, as indicated by arrows shown in FIG. 6B. The surface 25_s_ is formed with two holes 25_u_1 and 25_u_2 at different positions from the terminals 26. The hole 25_u_1 is an example of the "hole" of the present disclosure. The hole 25_u_2 is an example of the "another hole" of the present disclosure.

The holes 25_u_1 and 25_u_2 are both arranged in corners of the surface 25_s_. The hole 25_u_1 is arranged at one end of the surface 25_s_ in the scanning direction, while the hole 25_u_2 is arranged at the other end of the surface 25_s_ in the scanning direction. The hole 25_u_1 is shaped in a perfect circle, while the hole 25_u_2 has an elliptical shape that is elongated in the scanning direction. The hole 25_u_2 is longer in the scanning direction than the hole 25_u_1. In other words, the length of the hole 25_u_2 in the scanning direction is greater than the length of the hole 25_u_1 in the scanning direction.

The electronic member 15 has two protrusions 11*u* on the surface 15*s* on which the terminals 16 are provided. Each protrusion 11*u* has a columnar shape, and is configured to be fitted into a corresponding one of the holes 25*u*1 and 25*u*2. The protrusions 11*u* are arranged in corners of the surface 15*s*. The protrusion Ilu is an example of the "protrusion" and the "another protrusion" of the present disclosure.

The surface 15*s* of the electronic member 15 and the surface 25*s* of the electronic member 25 are positioned relative to each other by fitting the protrusions 11*u* into the corresponding holes 25*u*1 and 25*u*2.

When the pivot member 29 is moved from the open position (see FIG. 4) to the closed position (see FIG. 5), the urging member 291 is moved together with the pivot member 29 toward the head unit 10. The urging member 291 contacts the head unit 10 and presses the head unit 10 downward and downstream in the conveying direction. In a state where the pivot member 29 is in the closed position (see FIG. 5), the urging member 291 urges the head unit 10 downward and downstream in the conveying direction so that the head unit 10 is fixed in position relative to the support member 27.

Thus, the printer 1 is switchable between: a first state (see FIGS. 3 and 4) in which the head unit 10 is not positioned (not fixed in position) relative to the mounting unit 20, the communication ports 12*y* and the corresponding communication ports 22*y* are not in communication with each other, and the terminals 16 and the corresponding terminals 26 are in separation from each other; and a second state (see FIG. 5) in which the head unit 10 is positioned (fixed in position) relative to the mounting unit 20 using the urging member 291, the communication ports 12*y* and the corresponding communication ports 22*y* are in communication with each other, and the terminals 16 and the corresponding terminals 26 are in contact with each other. The printer 1 is shifted from the first state to the second state as the urging member 291, the channel member 21, and the electronic member 25 of the mounting unit 20 are moved relative to the head unit 10.

In the second state, the printer 1 controls, using the controller 90, the conveying motor, the scanning motor 34, and the driver IC 14 to convey a sheet 100 and to eject ink onto the same, thereby recording an image on the sheet 100.

According to the embodiment described above, the printer 1 is shifted from the first state to the second state (see FIGS. 4 and 5) by relative movement of both the channel member 21 and the urging member 291 of the mounting unit 20 to the head unit 10. Through this action, the process of connecting the channels 12 and 22 together and the process of positioning the head unit 10 can be achieved with a single step, thereby simplifying the operation for mounting the head unit 10 on the mounting unit 20.

The support member 27 has the recesses 27*x*, and the head unit 10 includes the protrusions 11*x* configured to be fitted into the respective recesses 27*x*. With this configuration, the head unit 10 can be supported by the support member 27 through a simple configuration of fitting the protrusions 11*x* into the respective recesses 27*x*.

The urging member 291, which functions as the positioning part, is provided at the pivot member 29. The urging member 291 is moved toward the head unit 10 in accordance with the pivotal movement of the pivot member 29. With this configuration, the urging member 291 is movable toward the head unit 10 through a simple operation of the pivotal movement of the pivot member 29.

The communication ports 12*y* are formed in the side surface 11*s* of the channel member 11, which is a surface different from the bottom surface 11*a* of the channel member 11 (see FIGS. 3 through 5). With this configuration, the operations related to connecting the channels 12 and 22 together are performed on the side surface 11*s* of the channel member 11, while the operations related to positioning of the head unit 10 (and hence positioning of the ejection holes 12*x*) are performed on the bottom surface 11*a* of the channel member 11. Therefore, these operations do not interfere with each other, enabling both the connection of the channels 12 and 22 together and the positioning of the head unit 10 to be performed reliably.

The channel member 21 is movable in the directions parallel to the side surface 21*s* (see FIG. 6A). With this configuration, the positions of the channels 22 can be adjusted in the directions parallel to the side surface 21*s* when connecting the channels 22 to the corresponding channels 12, whereby the channels 12 and 22 can be connected to each other easily and accurately.

The side surface 21*s* has the holes 21*v*1 and 21*v*2, and the side surface 11*s* includes the protrusions 11*v* configured to be fitted into the respective holes 21*v*1 and 21*v*2 (see FIG. 6A). With this configuration, the protrusions 11*v* are fitted into the respective holes 21*v*1 and 21*v*2 to position the side surfaces 11*s* and 21*s* relative to each other prior to connecting the channels 12 and 22. Accordingly, the channels 12 and 22 can be connected to each other precisely.

The holes 21*v*1 and 21*v*2 are arranged in corners of the side surface 21*s*, and the protrusions 11*v* are arranged in corners of the side surface 11*s* (see FIG. 6A). With this configuration, the operations related to fitting the protrusions 11*v* into the respective holes 21*v*1 and 21*v*2 are performed at the corners of the side surface 21*s*, while the operations related to connecting the channels 12 and 22 together are performed at the center of the side surface 21*s*. Accordingly, these operations do not interfere with each other, thereby enabling both the fitting of the protrusions 11*v* into the holes 21*v*1 and 21*v*2 and the connecting of the channels 12 and 22 to be performed reliably.

Of the two holes 21*v*1 and 21*v*2, one hole 21*v*2 is formed to be longer than the other hole 21*v*1 (see FIG. 6A). This configuration facilitates the operations related to fitting the protrusions 11*v* into the holes 21*v*1 and 21*v*2.

The electronic member 25 and the channel member 21 of the mounting unit 20 as well as the urging member 291, which functions as the positioning part, are moved relative to the head unit 10 to allow the printer 1 to be shifted from the first state to the second state (see FIGS. 4 and 5). With this configuration, fixing of the head unit 10 in position, connection of the channels 12 and 22, and connection of the terminals 16 and 26 can all be achieved in a single step, making the operation for mounting the head unit 10 on the mounting unit 20 extremely simple.

In the mounting unit 20, the terminals 26 are arranged at a first position different from a second position. Specifically, the terminals 26 are arranged at positions above the communication ports 22*y*. The second position is a position which is below and aligned with the communication ports 22*y* in the vertical direction.

If the terminals 26 were arranged in the second position, ink leaking from points of connection between the communication ports 12*y* and 22*y* could become deposited on the terminals 16 and 26 and lead to defects in the electronic members 15 and 25. In this respect, arranging the terminals 26 in the first position as in the embodiment described above can prevent such defects in the electronic members 15 and 25.

The electronic member 15 is disposed on the side surface 11*s* of the channel member 11, which is a surface different from the bottom surface 11*a* of the channel member 11 (see FIGS. 3 through 5). With this configuration, the operations related to connecting the terminals 16 and 26 together are performed on the side surface 11*s* of the channel member 11, while the operations related to positioning the head unit 10 (and hence positioning of the ejection holes 12*x*) are performed on the bottom surface 11*a* of the channel member 11. Accordingly, these operations do not interfere with each other, enabling both the connection of the terminals 16 and 26 and the positioning of the head unit 10 to be performed reliably.

The electronic member 25 is movable in the directions parallel to the surface 25*s* (see FIG. 6B). With this configuration, the positions of the terminals 26 can be adjusted in the directions parallel to the surface 25*s* at the time of connection of the terminals 26 to the corresponding terminals 16, whereby the terminals 16 and 26 can be connected to each other easily and accurately.

The surface 25*s* has the holes 25*u*1 and 25*u*2, and the surface 15*s* includes the protrusions 11*u* configured to be fitted into the respective holes 25*u*1 and 25*u*2 (see FIG. 6B). With this configuration, the protrusions 11*u* are fitted into the respective holes 25*u*1 and 25*u*2 to position the surfaces 15*s* and 25*s* relative to each other prior to connecting the terminals 16 and 26. As a result, the terminals 16 and 26 can be connected precisely.

The holes 25*u*1 and 25*u*2 are arranged in corners of the surface 25*s*, and the protrusions 11*u* are arranged in corners of the surface 15*s* (see FIG. 6B). With this configuration, the operations related to fitting the protrusions Ilu into the respective holes 25*u*1 and 25*u*2 are performed at the corners of the surface 25*s*, while the operations related to connecting the terminals 16 and 26 are performed at the center of the surface 25*s*. Accordingly, these operations do not interfere with each other, thereby enabling both the fitting of the protrusions 11*u* into the holes 25*u*1 and 25*u*2 and the connection of the terminals 16 and 26 to be performed reliably.

Of the two holes 25*u*1 and 25*u*2, one hole 25*u*2 is longer than the other hole 25*u*1 (see FIG. 6B). With this configuration, the protrusion 11*u* inserted into the hole 25*u*2 is movable within the hole 25*u*2 when fitting the protrusions 11*u* into the holes 25*u*1 and 25*u*2, thereby facilitating the operations related to fitting the protrusions 11*u* into the holes 25*u*1 and 25*u*2.

Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The timings at which positioning of the head unit 10 is performed, the channels 12 and the corresponding channels 22 are connected to each other, and the terminals 16 and the corresponding terminals 26 are connected to each other need not be simultaneous but may be different from one another.

In the embodiment described above, the support member 27 has the recesses 27*x*, and the head unit 10 includes the protrusions 11*x* configured to be fitted into the respective recesses 27*x*. However, the configurations of the support member 27 and the head unit 10 need not be limited to this. For example, the head unit 10 may have two recesses on the respective side surfaces 11*e*, and the support member 27 may include two protrusions configured to be fitted into the respective two recesses of the head unit 10.

In the embodiment described above, the side surface 21*s* has the holes 21*v*1 and 21*v*2, and the side surface 11*s* includes the protrusions 11*v* configured to be fitted into the respective holes 21*v*1 and 21*v*2 (see FIG. 6A). However, other configurations may be employed. For example, the side surface 11*s* may have two holes, while the side surface 21*s* may include two protrusions configured to be fitted into the respective holes formed in the side surface 11*s*. In this case, one hole in the side surface 11*s* may be longer in the scanning direction than the other hole in the side surface 11*s*.

In the embodiment described above, the surface 25*s* has the holes 25*u*1 and 25*u*2, and the surface 15*s* includes the protrusions 11*u* configured to be fitted into the respective holes 25*u*1 and 25*u*2 (see FIG. 6B). However, the present disclosure need not be limited to this configuration. For example, the surface 15*s* may have two holes, and the surface 25*s* may include two protrusions configured to be fitted into the respective holes formed in the surface 15*s*. In this case, one hole in the surface 15*s* may be longer in the scanning direction than the other hole in the surface 15*s*.

In the embodiment described above, the communication ports 12*y* and the communication ports 22*y* are openings through which liquid is supplied into the corresponding channels 12 from the corresponding tanks 40C, 40M, 40Y, and 40K. However, the communication ports 12*y* and the communication ports 22*y* may serve as openings through which liquid is returned from the corresponding channels 12 to the corresponding tanks 40C, 40M, 40Y, and 40K, for example.

While the terminals 26 are positioned above the communication ports 22*y* in the embodiment described above, the terminals 26 are not limited to this arrangement. For example, the terminals 26 may be disposed below the communication ports 22*y* at positions not aligned with the communication ports 22*y* in the vertical direction.

The head unit 10 need not be limited to a serial-type head, but may be a line-type head. In a case where the line-type head unit 10 is employed, the mounting unit 20 may be fixed to the housing 1*a* of the printer 1 and need not move together with the head unit 10 relative to the housing 1*a*.

The target onto which liquid is to be ejected is not limited to paper, but may be fabric, substrates, or plastic materials, for example.

The liquid ejected from the ejection holes 12*x* is not limited to ink but may be any liquid, such as treatment liquid for coagulating or precipitating components in ink.

The present disclosure may be applied not only to a printer, but also to a facsimile machine, a copy machine, a multifunction peripheral, or the like. Alternatively, the present disclosure may be applied to a liquid ejecting device used in applications other than recording images, such as a liquid ejecting device for forming conductive patterns by ejecting conductive liquid onto a substrate.

What is claimed is:

1. A liquid ejecting device comprising:

a head unit comprising:

a first channel member formed with a first channel having:

an ejection hole; and a first communication port in communication with the ejection hole to allow fluid to flow therebetween; and a mounting unit which the head unit is mountable on and removable from, the mounting unit supporting the head unit in a state where the head unit is mounted on the mounting unit, the mounting unit comprising:

a second channel member formed with a second channel having:

a second communication port; and a positioning part, wherein the liquid ejecting device is switchable between:

a first state in which the head unit is not positioned relative to the mounting unit, and the first communication port and the second communication port are not in communication with each other; and a second state in which the head unit is positioned relative to the mounting unit with the positioning part, and the first communication port and the second communication port are in communication with each other to allow fluid to flow from the second communication port through the first communication port to the ejection hole, and wherein the liquid ejecting device is shifted from the first state to the second state as the second channel member and the positioning part are moved relative to the head unit.

2. The liquid ejecting device according to claim 1, further comprising:

a recess and a protrusion configured to be fitted into the recess, wherein the mounting unit further comprises a support member supporting the head unit in a state where the head unit is mounted on the mounting unit, wherein the support member has one of the recess or the protrusion, and wherein the head unit has the other of the recess or the protrusion.

3. The liquid ejecting device according to claim 2, wherein the head unit is moved toward the second channel member by pivotally moving about the protrusion.

4. The liquid ejecting device according to claim 2, wherein the mounting unit further comprises a pivot member attached to the support member such that the pivot member is pivotally movable, wherein the positioning part is provided at the pivot member, and wherein the positioning part is moved toward the head unit as the pivot member is pivotally moved.

5. The liquid ejecting device according to claim 1, wherein the first channel member has:

an ejection surface in which the ejection hole is open;

an opposite surface on a side opposite the ejection surface; and a first surface in which the first communication port is open, the first surface connecting the ejection surface and the opposite surface to each other.

6. The liquid ejecting device according to claim 5, wherein the second channel member has:

a second surface in which the second communication port is open, and wherein the second channel member is movable in a direction parallel to the second surface.

7. The liquid ejecting device according to claim 6, further comprising:

a protrusion and a hole at a different position from the second communication port, the protrusion being configured to be fitted into the hole, wherein the second surface has one of the protrusion or the hole, and wherein the first surface has the other of the protrusion or the hole.

8. The liquid ejecting device according to claim 7, wherein the one of the protrusion or the hole is provided at a corner of the second surface, and wherein the other of the protrusion or the hole is provided at a corner of the first surface.

9. The liquid ejecting device according to claim 7, further comprising:

another protrusion and another hole at a different position from the second communication port, the another protrusion being configured to be fitted into the another hole, wherein the second surface further has one of the another protrusion or the another hole, wherein the first surface further has the other of the another protrusion or the another hole, and wherein the another hole is longer than the hole.

10. The liquid ejecting device according to claim 1, wherein the head unit further comprises:

a first electronic member comprising a first terminal, wherein the mounting unit further comprises:

a second electronic member comprising a second terminal, wherein in a state where the liquid ejecting device is in the first state, the first terminal and the second terminal are in separation from each other, wherein in a state where the liquid ejecting device is in the second state, the first terminal and the second terminal are in contact with each other, and wherein the liquid ejecting device is shifted from the first state to the second state as the second electronic member, the second channel member, and the positioning part are moved relative to the head unit.

11. The liquid ejecting device according to claim 10, wherein in the mounting unit, the second terminal is provided at a first position different from a second position, the second position being a position below the second communication port and aligned with the second communication port in a vertical direction.

12. The liquid ejecting device according to claim 10, wherein the first channel member has:

an ejection surface in which the ejection hole is open;

an opposite surface on a side opposite the ejection surface; and a first surface on which the first electronic member is provided, the first surface connecting the ejection surface and the opposite surface to each other.

13. The liquid ejecting device according to claim 12, wherein the second electronic member has:

a third surface on which the second terminal is provided, and wherein the second electronic member is movable in a direction parallel to the third surface.

14. The liquid ejecting device according to claim 13, further comprising:

a protrusion and a hole at a different position from the second terminal, the protrusion being configured to be fitted into the hole, wherein the third surface has one of the protrusion or the hole, wherein the first electronic member has:

a fourth surface on which the first terminal is provided, and wherein the fourth surface has the other of the protrusion or the hole.

15. The liquid ejecting device according to claim 14, wherein the one of the protrusion or the hole is provided at a corner of the third surface, and wherein the other of the protrusion or the hole is provided at a corner of the fourth surface.

16. The liquid ejecting device according to claim 14, further comprising:

another protrusion and another hole at a different position from the second terminal, the another protrusion being configured to be fitted into the another hole, wherein the third surface further has one of the another protrusion or the another hole, wherein the fourth surface further has the other of the another protrusion or the another hole, and wherein the another hole is longer than the hole.

* * * * *